United States Patent
Olrog

(10) Patent No.: US 10,063,495 B2
(45) Date of Patent: Aug. 28, 2018

(54) METHOD AND APPARATUS FOR IMPROVED HANDLING OF IMS NODE BLACKLISTING

(75) Inventor: Christian Olrog, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 318 days.

(21) Appl. No.: 14/378,535

(22) PCT Filed: Feb. 14, 2012

(86) PCT No.: PCT/EP2012/052516
§ 371 (c)(1),
(2), (4) Date: Dec. 18, 2014

(87) PCT Pub. No.: WO2013/120513
PCT Pub. Date: Aug. 22, 2013

(65) Prior Publication Data
US 2015/0124584 A1  May 7, 2015

(51) Int. Cl.
*H04L 12/939* (2013.01)
*H04L 12/26* (2006.01)
(Continued)

(52) U.S. Cl.
CPC .............. *H04L 49/557* (2013.01); *H04L 1/24* (2013.01); *H04L 43/0817* (2013.01);
(Continued)

(58) Field of Classification Search
CPC ....... H04L 49/557; H04L 45/28; H04L 12/66; H04L 1/24; H04L 12/703; H04L 29/06; H04W 36/08; H04W 88/04
See application file for complete search history.

(56) References Cited

U.S. PATENT DOCUMENTS

| 7,697,512 B1 * | 4/2010 | Allison, III | H04L 12/66 370/352 |
| 2008/0056234 A1 * | 3/2008 | Sprague | H04L 12/66 370/352 |

(Continued)

FOREIGN PATENT DOCUMENTS

| CN | 1968280 A | 5/2007 |
| CN | 101192920 A | 6/2008 |
| CN | 101193068 A | 6/2008 |

OTHER PUBLICATIONS

Shankai J S et al: "SNMP over SIP for network management", Network Operations and Management Symposium, 2004. NOMS 2004. IEEE/IFI P Seoul, Korea Apr. 19-23, 2004, Piscataway, NJ, USA,IEEE, vol. 1, Apr. 19, 2004 (Apr. 19, 2004), pp. 881-882, XP010712728, ISBN: 978-0-7803-8230-5.
(Continued)

*Primary Examiner* — Anez Ebrahim
(74) *Attorney, Agent, or Firm* — Rothwell, Figg, Ernst & Manbeck, P.C.

(57) ABSTRACT

Accordingly, there is provided an IMS node, comprising a transmission module and a processor. The transmission module is arranged to send SIP messages to a plurality of other IMS nodes. The processor arranged to detect an error in a particular other IMS node, the error indicating that the particular other IMS node is not available to receive traffic. In response to detection of such an error, the processor causes the particular other IMS node not to be used for a period of time. The transmission module is further arranged to send at least one test message to the particular other IMS node when the period of time expires. The processor is further arranged to determine if the at least one test message is successfully processed by the particular other IMS node, and in response to a positive determination then returning the particular other IMS node to use.

9 Claims, 3 Drawing Sheets

(51) Int. Cl.
   *H04L 29/06*      (2006.01)
   *H04L 1/24*       (2006.01)
   *H04L 12/703*     (2013.01)

(52) U.S. Cl.
   CPC .............. *H04L 43/10* (2013.01); *H04L 45/28* (2013.01); *H04L 65/1006* (2013.01); *H04L 65/1016* (2013.01); *H04L 65/1069* (2013.01); *H04L 65/80* (2013.01)

(56) References Cited

U.S. PATENT DOCUMENTS

| | | | |
|---|---|---|---|
| 2008/0267075 A1* | 10/2008 | Yasrebi | ............ H04L 29/12066 370/242 |
| 2009/0245238 A1* | 10/2009 | Yamazaki | ............... H04L 12/66 370/352 |
| 2012/0008506 A1 | 1/2012 | Astigarraga et al. | |

OTHER PUBLICATIONS

Office Action dated Jun. 2, 2016, issued in Chinese Patent Application No. 201280069733.X, 19 pages.
European Communication dated Jun. 3, 2016, issued in European Patent Application No. 12704769.4, 9 pages.
European Office Action issued in Application No. 12 704 769.4 dated Sep. 21, 2017, 8 pages.

\* cited by examiner

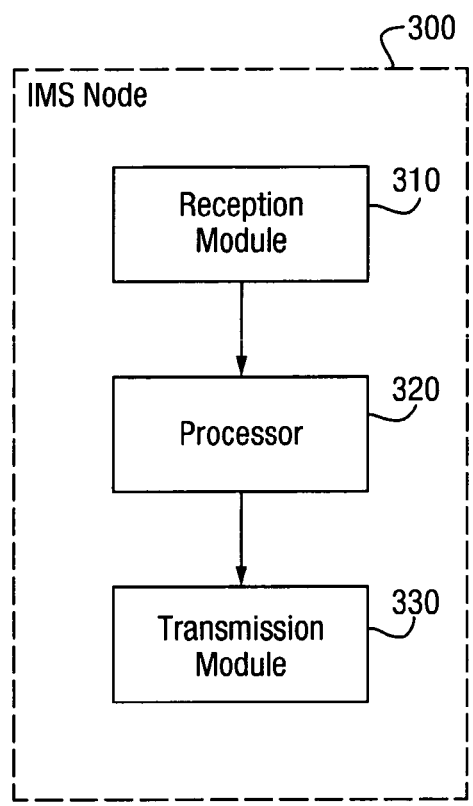

METHOD AND APPARATUS FOR IMPROVED HANDLING OF IMS NODE BLACKLISTING

CROSS REFERENCE TO RELATED APPLICATION(S)

This application is a 35 U.S.C. § 371 National Phase Entry Application from PCT/EP2012/052516, filed Feb. 14, 2012, designating the United States, the disclosure of which is incorporated herein in its entirety by reference.

TECHNICAL FIELD

The present application relates to an IP Multimedia Subsystem (IMS) node, a method in an IMS node, and a computer-readable medium.

BACKGROUND

In an IMS network, routing is used to find a user or a function in the network. The main mechanism used for routing in the IMS network is DNS. In operation a first IMS node may attempt to send a message to a second IMS node. If the second IMS node is, for some reason, not available to receive traffic it might be added to a blacklist maintained at the first IMS node. The second IMS node may indicate to the first IMS node that it is not available to receive traffic, or the first IMS node may detect the second IMS node is unavailable by the behaviour of the second IMS node.

Depending on the reason for blacklisting, an entire host or individual ports of a host (including its transport protocols) may have to be blacklisted. An IMS node is blacklisted for a predetermined period of time. The period of time may be determined according to the event that triggered the blacklisting.

As a faulting host is removed from a blacklist a large number of calls may fail. For example, consider a system whereby a first IMS node comprising a Call Session Control Function (CSCF) distributes Session Initiation Protocol (SIP) calls to two hosts which are a second and third IMS node. The CSCF has a call load of 100 Calls per second (Cps) and these are distributed over the two hosts round robin. If one of the hosts fails (e.g. the second IMS node enters an error state due to power failure), then 50% of calls will be directed towards the faulty host until the error state is detected and the failed host (the second IMS node) is blacklisted. Once the failed node is blacklisted then current implementations require that it is removed from the blacklist when the appropriate period of time has elapsed. Typically, after a few initial short trials on the order of 30 seconds the CSCF will remove the failed host from the blacklist every 10 minutes on the assumption that by that time the failed host will have recovered.

If the failed host is in an error state for a prolonged period, then each time it is removed from the blacklist the error state will be detected again and the failed host will be blacklisted again.

Each time the failed host is removed from the blacklist it typically takes 32 seconds to detect that it has not yet recovered. (32 seconds is the SIP Transaction timeout default.) If we assume that anything above 10 seconds is considered a lost call, then $100\ \text{Cps} \times \frac{1}{2} \times 22\ \text{seconds} = 1100$ call setups lost before the failed host is again blacklisted. Accordingly, current arrangements require that a large number of call setups are lost every time a failed host is removed from blacklist before it has recovered from an error state.

Lost call setups reduce the effectiveness of the network and also have a negative impact on the quality of service for the end users.

For at least the above reasons, there is a need for a method and apparatus for improved handling of IMS node blacklisting.

SUMMARY

Accordingly, there is provided an IMS node, comprising a transmission module and a processor. The transmission module is arranged to send SIP messages to a plurality of other IMS nodes. The processor is arranged to detect an error in a particular other IMS node, the error indicating that the particular other IMS node is not available to receive traffic. In response to detection of such an error, the processor causes the particular other IMS node not to be used for a period of time. The transmission module is further arranged to send at least one test message to the particular other IMS node when the period of time expires. The processor is further arranged to determine if the at least one test message is successfully processed by the particular other IMS node, and in response to a positive determination then returning the particular other IMS node to use.

Prior art IMS nodes simply return the particular node to use upon expiry of the period of time for which the particular other IMS node is not used. If, at that time, the particular other IMS node is still in an error state then the prior art IMS node will detect further errors and the particular other IMS node is then not used for another period of time. A problem with the prior art arrangement is that there is a significant time delay in the detection of the error status in the particular other IMS node. A significant number of messages can be sent to the particular other IMS node during the time delay between it being returned to use and the error state being re-detected. All messages sent to the particular other IMS node during the period of the time delay are not properly processed and can result in network errors such as lost call setups.

The method and apparatus disclosed herein greatly reduces the number of network errors created by an IMS node experiencing an error state by testing an IMS node before returning it to use.

Causing the particular other IMS node not to be used for a period of time may comprise removing the particular other IMS node from use for a period of time. Causing the particular other IMS node not to be used may be achieved by blacklisting the particular other IMS node.

The transmission module may be further arranged to send SIP messages to other IMS nodes that are not blacklisted. The transmission module may be further arranged to send at least one test message to the particular other IMS node if incoming activity from the particular other IMS node is detected during the period of time for which the particular other IMS node is not being used.

If the processor determines that the at least one test message is not successfully processed by the particular other IMS node, then the processor may cause the particular other IMS node not to be used for a further predetermined period of time. The processor may determine that the at least one test message is successfully processed by the absence of an error being detected.

The test message may be at least one of: a SIP message received by the IMS node; a SIP message generated by the IMS node; a SIP OPTION message; a SIP INVITE message; an ICMP message; and a ping. The error may be detected by receipt of an error notification.

The IMS node may be at least one of: an IMS Application Server; a media gateway; a border gateway; a border controller and a CSCF.

There is further provided a method in an IMS node. The method comprises sending SIP messages to a plurality of other IMS nodes, and further comprises detecting an error in a particular other IMS node, the error indicating that the particular other IMS node is not available to receive traffic. The method also comprises not using the particular other IMS node for a period of time in response to the detection of the error, and sending at least one test message to the particular other IMS node when the period of time expires. The method further comprises determining whether the at least one test message is successfully processed by the particular node, and if it is, then returning the node to use.

Not using the particular other IMS node for a period of time in response to the detection of the error may comprise removing the particular other IMS node from use for a period of time in response to the detection of the error. Not using the particular other IMS node may be achieved by blacklisting the IMS node. SIP messages may be sent to other IMS nodes that are not blacklisted.

The method may further comprise sending at least one test message to the particular other IMS node if incoming activity from the particular other IMS node is detected during the period of time for which the particular other IMS node is not used.

If it is determined that the at least one test message is not successfully processed by the particular other IMS node, then the particular other IMS node may not be used for a further predetermined period of time.

The method may further comprise determining that the at least one test message is successfully processed in the absence of a further error being detected.

The at least one test message may comprise at least one of: a SIP message received by the IMS node; a SIP message generated by the IMS node; a SIP OPTION message; a SIP INVITE message; an ICMP message; and a ping.

The error may be detected by receipt of an error notification. The error notification may be received via a message from an external source, or the error notification may be internally generated.

The IMS node may be at least one of: an IMS application Server; a media gateway; a border gateway; and a CSCF.

There is further provided a computer-readable medium, carrying instructions, which, when executed by computer logic, causes said computer logic to carry out any of the methods defined herein.

BRIEF DESCRIPTION OF THE DRAWINGS

A method and apparatus for improved handling of IMS node blacklisting will now be described, by way of example only, with reference to the accompanying drawings, in which:

FIG. 3 shows an IMS node for performing the method described herein.

DETAILED DESCRIPTION

Figure 1:
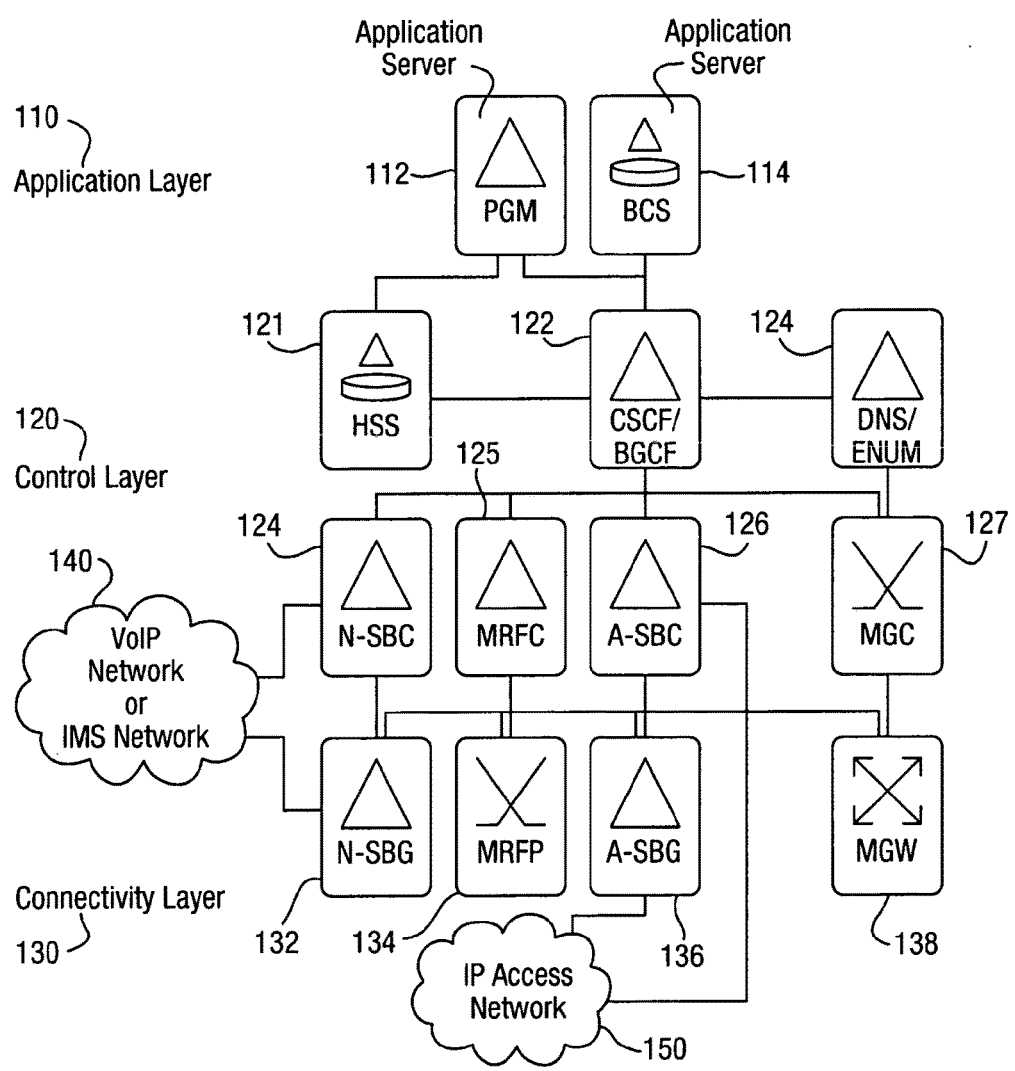
FIG. 1 shows the components of an IMS network.

FIG. 1 shows a generic IP Multimedia Subsystem (IMS) network. The IMS network can broadly be defined as comprising 3 layers: an application layer 110, a control layer 120, and a connectivity layer 130. Each of the nodes in FIG. 1 may be considered to be an IMS network node as described herein. The application layer 110 comprises application servers which provide services to users. The application layer 110 is shown as comprising a presence and group management server 112 and a business communication suite 114. The application layer 110 comprises SIP application servers to host, process and store data and provide various services to users. A third party service provider can host their service on an application server in the application layer 110 leaving network control to the other layers, which are typically maintained by service providers.

The control layer 120 can be considered as providing the intelligence in the network. The control layer 120 comprises: a home subscriber server 121, a call session control function (CSCF)/breakout gateway control function 122, a domain name system/E.164 Number Mapping Server 124, a network session border controller 124, a media resource function controller 125, an access session border controller 126 and a media gateway controller 127. The control layer 120 manages the setup, call modification and call release. An important component of the control layer 120 is the CSCF server 122. The CSCF server 122 can be thought of as a SIP server, which manages call, session routing and file protocols. The control layer 120 also contains other servers to provide functions such as provisioning, charging and operation & management. Interfacing with other networks is provided by respective gateways. The home subscriber server 121 maintains a database to store the unique service profile for each end user.

The connectivity layer 130 comprises a network session border gateway 132, a media resource function processor 134, an access session border gateway 136, and a media gateway 138. The connectivity layer 130 comprises the network backbone as well as external access to the network. It provides an interface for the networks & devices that require access to the IMS network. The connectivity layer 130 functions as an entry and exit point to the network.

Access to another network 140, such as a VoIP network or other IMS network is provided by the network session border controller 124 and the network session border gateway 136. Connection to an IP access network 150 is provided by the access session border controller 126 and the access session border gateway 136.

Figure 2:
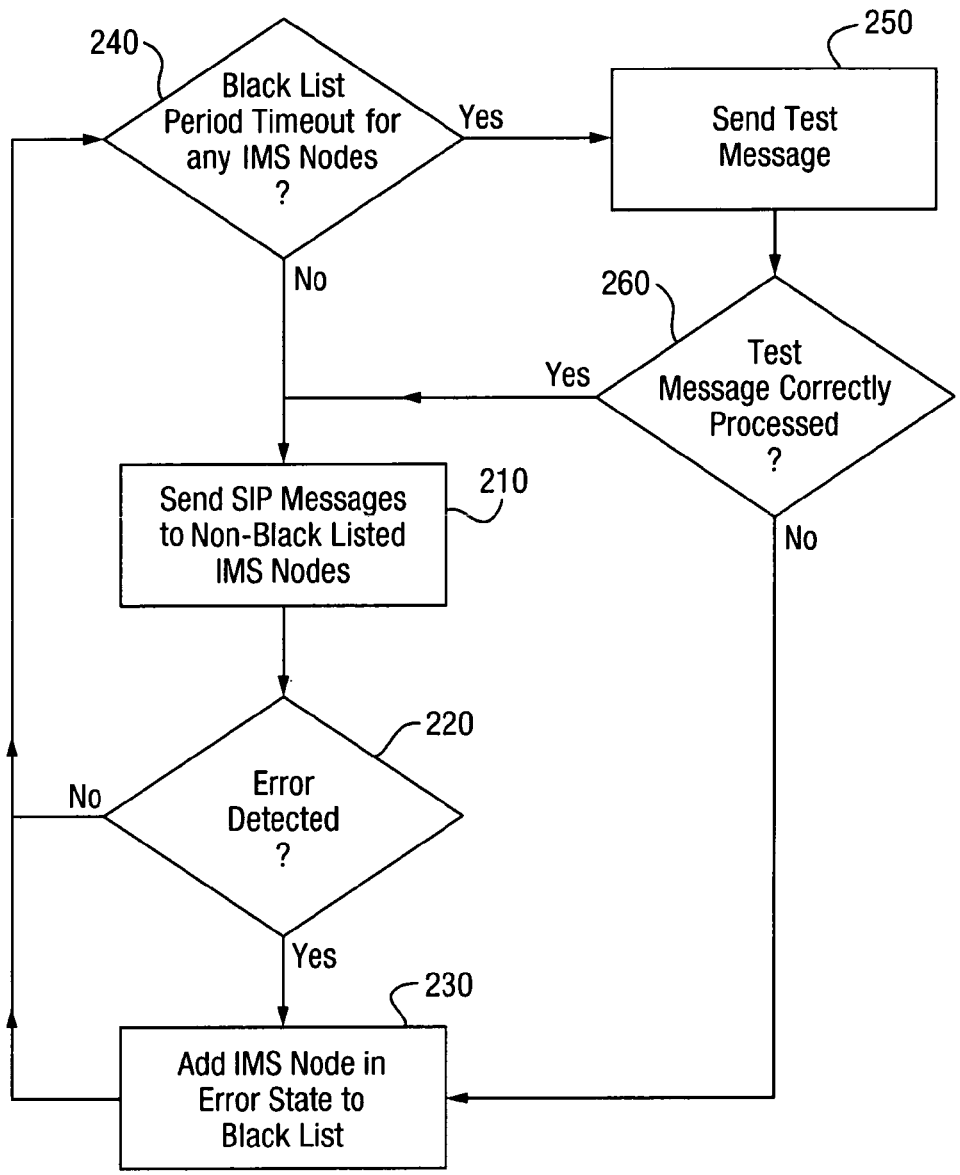
FIG. 2 shows a method of black list handling in an IMS node.

FIG. 2 is a flow diagram illustrating the method disclosed herein. At 210 an IMS node sends SIP messages to a plurality of other IMS nodes that are not blacklisted. At 220, the IMS node determines if an error is detected in any of the IMS nodes to which it has sent a SIP message. If an error is detected at 220, then the IMS node for which the error is detected is blacklisted at 230. After blacklisting at 230, or if no error is detected at 220, then the process returns to 240 where a determination is made as to whether the blacklist time period has expired for any blacklisted IMS nodes. If no blacklist time periods have expired then the blacklist is unchanged and the process returns to 210 and the IMS node sends SIP messages to the non-blacklisted other IMS nodes.

If, at 240, a determination is made that the blacklist time period has expired for any blacklisted IMS nodes, then at 250 a test message is sent to the IMS nodes for which the blacklist time period has expired. At 260, a determination is made as to whether the test message is correctly processed by the IMS node to which it was sent. If the test message is not correctly processed, then the IMS node to which it was sent is determined to be in an error state and that IMS node is re-blacklisted at 230.

If the test message is correctly processed, then the IMS node to which it was sent is determined to no longer be in an error state and it is returned to normal use. The method then returns to 210 and the IMS node proceeds to send SIP messages to non-blacklisted other IMS nodes.

A previously blacklisted IMS node is removed from the blacklist upon expiry of the blacklist time period, but it is not returned to normal use until it is determined that it has successfully processed a test message sent to it. During the time between the blacklist time period expiring and the determination as to whether the test message is successfully processed, the previously blacklisted IMS node can be considered to be in quarantine, whereby it is neither blacklisted nor in normal use. This means that an IMS node can classify the other IMS nodes in the network in one of three classes: blacklisted, in normal use, and in quarantine.

Regarding blacklisting, a connectivity problem may be related to firewall filtering on source addresses rather than other network or destination host failures. As such a destination may well be reachable from one source address but not from another. For these reasons, all blacklisting entries except those triggered by a SIP 503 response may include source transport address (IP address, port and transport protocol) in combination with destination transport address (IP address, port and transport protocol).

FIG. 3 shows an IMS node 300 for performing the method described herein. The IMS node 300 comprises a reception module 310, a processor 320 and a transmission module 330. In operation, the reception module 310 receives a communication requiring the IMS node 300 to send a SIP message to another IMS node. The transmission module 330 of the IMS node 300 is arranged to send SIP messages to a plurality of other IMS nodes. The processor 320 is arranged to detect an error in a particular other IMS node, the error indicating that the particular other IMS node is not available to receive traffic. In response to such a detection, the processor 320 causes the particular other IMS node not to be used for a period of time, which comprises the blacklist time period.

The transmission module 330 is further arranged to send at least one test message to the particular other IMS node when the period of time expires. Further, the processor 320 is arranged to determine if the at least one test message is successfully processed by the particular other IMS node, and in response to a positive determination then returning the particular other IMS node to normal use.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

Further, while examples have been given in the context of particular communications standards, these examples are not intended to be the limit of the communications standards to which the disclosed method and apparatus may be applied. For example, while specific examples have been given in the context of IMS, the principles disclosed herein can also be applied to any network configuration which uses blacklisting to track errors at particular nodes.

The invention claimed is:

1. An IMS node, comprising:
a processor configured to analyze a blacklist containing a set of IMS nodes, each IMS node placed in the blacklist or returned to the black list associated with a predetermined period of time in which the black listed IMS node remains on the blacklist;
a transmitter configured to send SIP messages to a plurality of other IMS nodes that the processor determines are in normal use and not included on the blacklist; and
the processor configured to detect, in response to the sending the SIP messages, an error in a particular other IMS node, the error indicating that the particular other IMS node is not available to receive traffic, and in response to such a detection, causing the particular other IMS node not to be used for the predetermined period of time by placing the particular other IMS node on the blacklist in which the particular other IMS node does not receive SIP messages while on the blacklist;
wherein:
in response to determining that the predetermined period of time for the particular other IMS node has expired, the processor transfers the particular other IMS node from the blacklist to a quarantine state in which the particular other IMS node does not receive SIP messages in the quarantine state,
while the particular other IMS node is in the quarantine state:
(i) the transmitter is configured to send at least one test message to the particular other IMS node when the predetermined period of time expires and the particular other IMS node is in the quarantine state,
(ii) the processor is configured to determine if the at least one test message is successfully processed by the particular other IMS node,
(iii) in response to a positive determination that the at least one test message is successfully processed, the processor is configured to return the particular other IMS node to normal use, and
(iv) in response to a negative determination that the at least one test message is not successfully processed, the processor is configured to return the particular IMS node to the blacklist,
wherein the transmitter is further configured to send at least one test message to the particular other IMS node if incoming activity from the particular other IMS node is detected during the period of time for which the particular other IMS node is not being used,
wherein the processor determines that the at least one test message is successfully processed by the absence of an error being detected.

2. The IMS node of claim 1, wherein the at least one test message comprises at least one of:
a SIP message received by the IMS node;
a SIP message generated by the IMS node;
a SIP OPTION message;
a SIP INVITE message;
an ICMP message; and
a ping.

3. The IMS node of claim 1, wherein an error is detected by receipt of an error notification.

4. The IMS node of claim 1, wherein the IMS node is at least one of:
an IMS Application Server;
a media gateway;
a border gateway;
a border controller; and
a CSCF.

5. A method in an IMS node, the method comprising:
analyzing a blacklist containing a set of IMS nodes, each IMS node placed in the blacklist or returned to the black list associated with a predetermined period of time in which the black listed IMS node remains on the blacklist;

sending SIP messages to a plurality of other IMS nodes that are determined from the analyzing to be in normal use and not included on the blacklist;

detecting, in response to sending the SIP messages, an error in a particular other IMS node, the error indicating that the particular other IMS node is not available to receive traffic;

placing the particular other IMS node on the blacklist for a predetermined period of time, the particular other IMS node not being used during the predetermined period of time in which the particular other IMS node does not receive SIP messages while on the blacklist;

in response to determining that the predetermined period of time for the particular other IMS node has expired, transferring the particular other IMS node from the blacklist to a quarantine state in which the particular other IMS node does not receive SIP messages in the quarantine state; and while the particular other IMS node is in the quarantine state:
(i) sending at least one test message to the particular other IMS node when the particular other IMS node is in the quarantine state,
(ii) determining if the at least one test message is successfully processed by the particular other IMS node,
(iii) in response to determining that the at least one test message is successfully processed by the particular other IMS node, returning the node to use, and
(iv) in response to determining that the at least one test is not successfully processed by the particular other IMS node, returning the particular other IMS node to the blacklist, wherein the method further comprises sending at least one test message to the particular other IMS node if incoming activity from the particular other IMS node is detected during the period of time for which the particular other IMS node is not used, and wherein the at least one test message is successfully processed in the absence of a further error being detected.

6. The method of claim 5, wherein the at least one test message comprises at least one of:
a SIP message received by the IMS node;
a SIP message generated by the IMS node;
a SIP OPTION message;
a SIP INVITE message;
an ICMP message; and
a ping.

7. The method of claim 5, wherein an error is detected by receipt of an error notification.

8. The method of claim 5, wherein the IMS node is at least one of:
an IMS application Server;
a media gateway;
a border gateway; and
a CSCF.

9. A non-transitory computer-readable medium, carrying instructions, which, when executed by computer logic, causes said computer logic to carry out the method of claim 5.

* * * * *